(12) United States Patent
Hosoki

(10) Patent No.: US 10,718,976 B2
(45) Date of Patent: Jul. 21, 2020

(54) LIGHTING DEVICE AND IMAGE DISPLAY DEVICE

(71) Applicant: SHARP KABUSHIKI KAISHA, Sakai, Osaka (JP)

(72) Inventor: Mitsuru Hosoki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/569,001

(22) Filed: Sep. 12, 2019

(65) Prior Publication Data

US 2020/0089060 A1   Mar. 19, 2020

Related U.S. Application Data

(60) Provisional application No. 62/731,571, filed on Sep. 14, 2018.

(51) Int. Cl.
*G02F 1/133*   (2006.01)
*G02F 1/13357*   (2006.01)

(52) U.S. Cl.
CPC .. *G02F 1/133611* (2013.01); *G02F 1/133603* (2013.01); *G02F 1/133605* (2013.01); *G02F 1/133606* (2013.01); *G02F 1/133608* (2013.01); *G02F 2001/133607* (2013.01); *G02F 2001/133628* (2013.01)

(58) Field of Classification Search
CPC ............. H01L 27/3223; H01L 27/3246; H01L 51/0012; H01L 51/50; H01L 51/56; G02F 1/133611; G02F 1/133603; G02F 1/133605; G02F 1/133606; G02F 1/133608

See application file for complete search history.

(56) References Cited

U.S. PATENT DOCUMENTS

| | | | |
|---|---|---|---|
| 2003/0098124 A1* | 5/2003 | Clark | .................... C23C 14/042 156/751 |
| 2012/0063133 A1* | 3/2012 | Takeuchi | .......... G02F 1/133603 362/235 |
| 2012/0087122 A1 | 4/2012 | Takeuchi et al. | |
| 2012/0087126 A1 | 4/2012 | Takeuchi et al. | |
| 2012/0105763 A1 | 5/2012 | Takeuchi et al. | |
| 2013/0279173 A1 | 10/2013 | Takeuchi et al. | |
| 2014/0098520 A1 | 4/2014 | Takeuchi et al. | |
| 2014/0313733 A1 | 10/2014 | Takeuchi et al. | |
| 2014/0353598 A1* | 12/2014 | Jeong | .................... H01L 23/544 257/40 |
| 2019/0123307 A1* | 4/2019 | Kim, II | ............... H01L 27/3246 |

FOREIGN PATENT DOCUMENTS

JP       5351723 B2   11/2013

* cited by examiner

*Primary Examiner* — Anne M Hines

(74) *Attorney, Agent, or Firm* — ScienBiziP, P.C.

(57) ABSTRACT

A lighting device includes a chassis; light sources; and a rectangular substrate formed of a long rectangular plate-shaped member disposed in the chassis, having the light sources attached to a front surface thereof, and having a plurality of first alignments indicating positions of the light sources. The plurality of first alignments are provided at positions facing each other with the light source interposed therebetween a pair of long sides of the rectangular substrate, and are confirmed at least from a back surface side of the rectangular substrate.

6 Claims, 10 Drawing Sheets

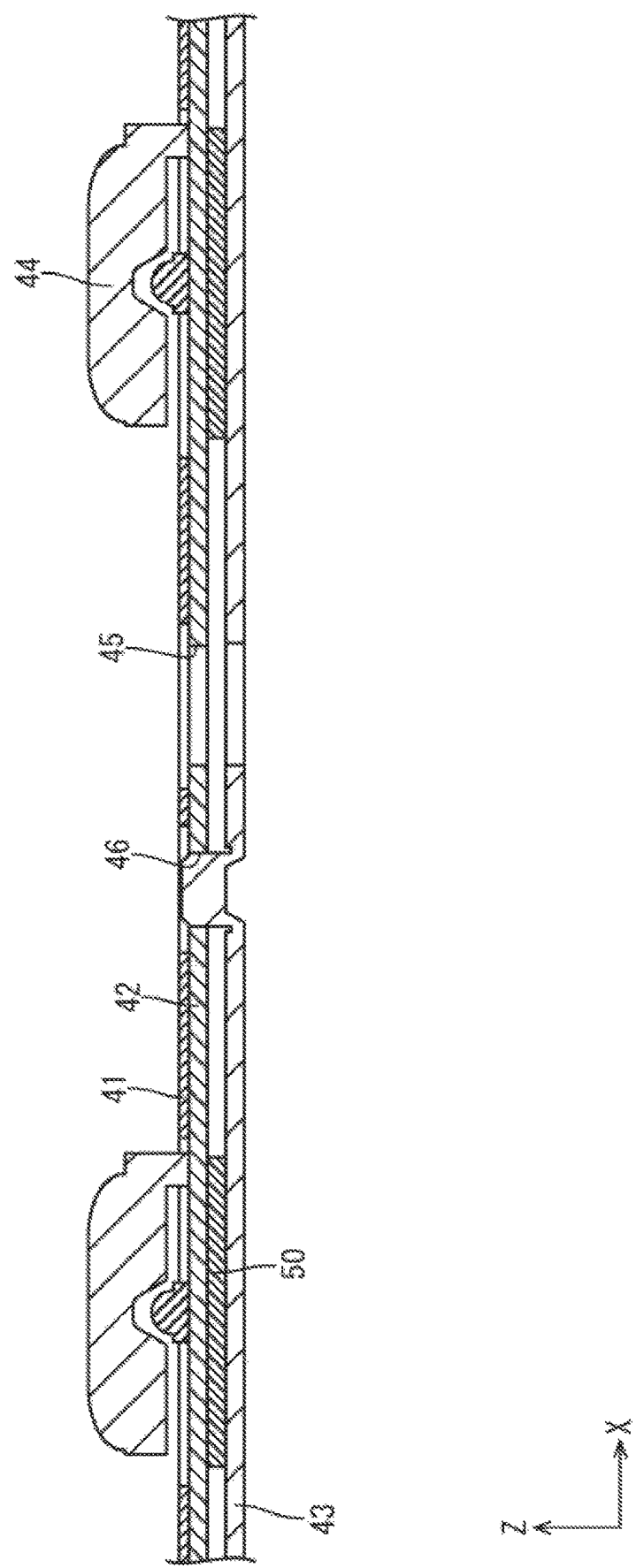

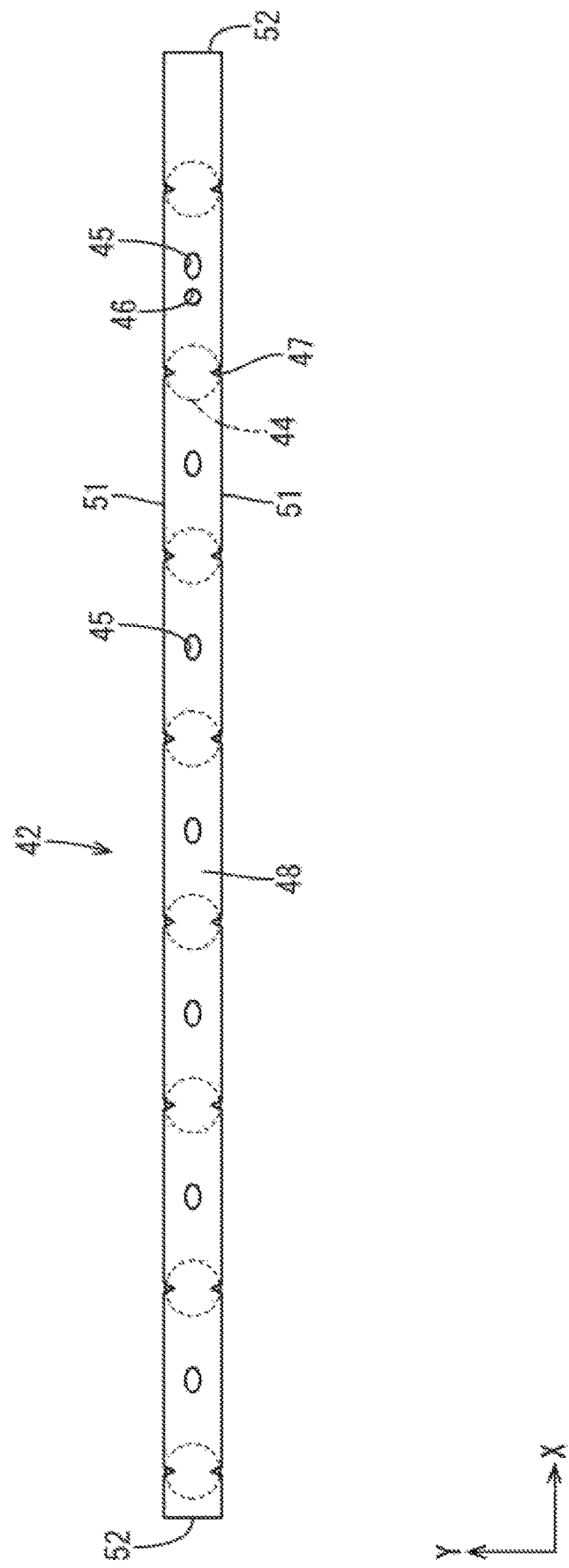

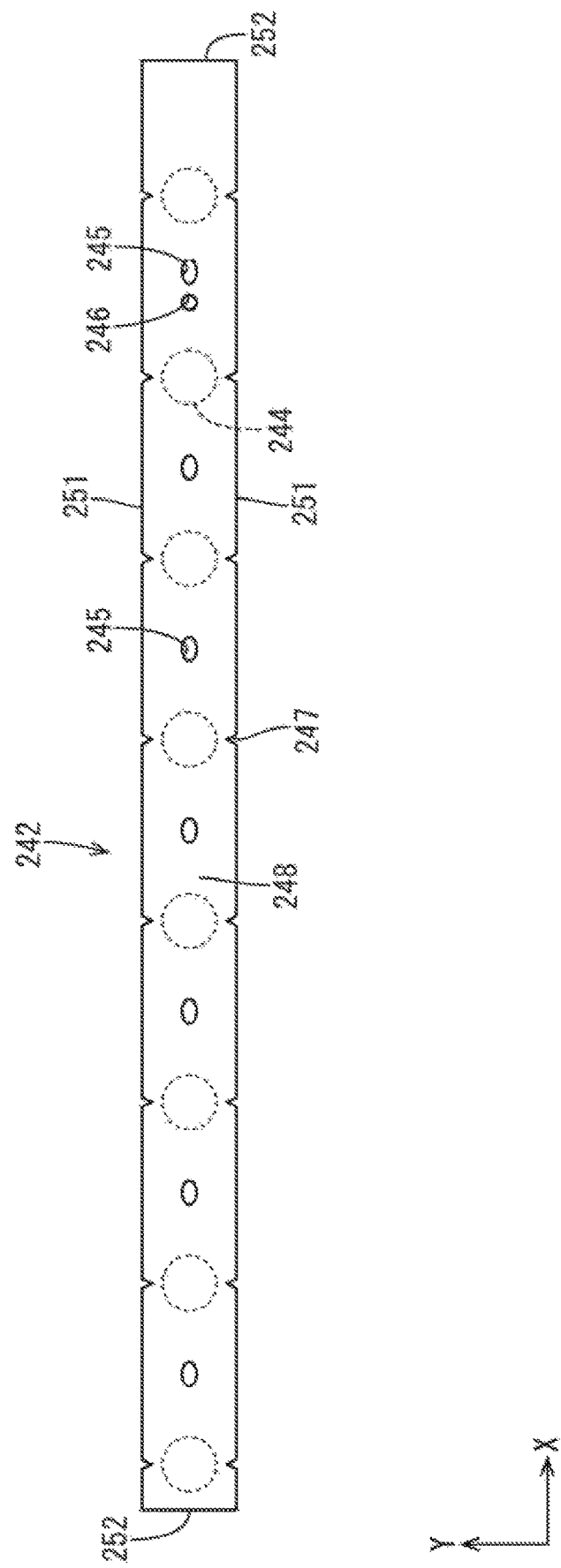

… (1)

LIGHTING DEVICE AND IMAGE DISPLAY DEVICE

CROSS REFERENCE TO RELATED APPLICATION

This application claims priority from U.S. Provisional Patent Application No. 62/731,571 filed on Sep. 14, 2018. The entire contents of the priority application are incorporated herein by reference.

TECHNICAL FIELD

The technology described herein relates to a lighting device to which a light emitting element is attached and an image display device.

BACKGROUND

In recent years, despite high definition of an image display device, transmittance has been lowered while the total luminous flux of a light source has been increased. In order to increase the luminous flux, the number of light sources to be attached is increased or the power per one light source is increased, but in either case, power consumption of the entire light source is increased. Comparing a direct type in which the light sources are arranged on the whole backlight chassis and an edge light type in which the light sources are arranged on a side surface the backlight chassis as the arrangement of the light sources, the direct type is advantageous in terms of heat radiation, and a high definition image display device often uses a direct type backlight.

In the direct type backlight, a plurality of rectangular substrates to which a plurality of light sources are attached are arranged. As the light source, a light emitting diode (LED) or the like is used, and from the viewpoint of improving heat radiation, a metal plate such as aluminum is often used for rectangular substrate. An example of such a system is disclosed in Japanese Patent Publication No. 5351723.

However, when the metal substrate such as aluminum is used for the rectangular substrate, it is difficult to form a wiring pattern on a back surface of the substrate and it is difficult to specify a position of the LED from the back surface because the metal is exposed on the back surface of the substrate on which the LED is not mounted. Therefore, it is necessary to dispose a heat radiation member on the entire back surface. Further, when the backlight chassis is a metal such as iron, coefficients of thermal expansion of the aluminum used for the substrate and the iron used for the chassis are different. In this case, if a heat radiation tape with a double-sided adhesive property is used for the heat radiation member, the aluminum substrate may be peeled off and float from the iron chassis.

SUMMARY

The technology described herein has been made in view of the above-mentioned problems, and an object of the technology described herein is to provide a substrate having an excellent close-contactability with a chassis by increasing a luminous flux of a light source and enhancing heat radiation.

A lighting device includes a chassis; light sources; and a rectangular substrate formed of a long rectangular plate-shaped member disposed in the chassis, having the light sources disposed on a front surface thereof, and having a plurality of first alignments indicating positions where the light sources are disposed, in which the plurality of first alignments are provided at positions facing each other with the light source interposed therebetween on a pair of long sides of the rectangular substrate, and are configured to be confirmed at least from a back surface side of the rectangular substrate.

An image display device includes the lighting device.

According to the technology described herein, even if the rectangular substrate is made of a metal plate such as aluminum, since the position of the light source can be confirmed from the back surface of the rectangular substrate, the heat radiation property can be improved by appropriately arranging the heat radiation member.

BRIEF DESCRIPTION OF THE DRAWINGS

FIG. 3A is a cross-sectional view of the lighting device taken along the line A-A' in FIG. 2, and is a view showing a state before a rectangular substrate is fixed to a backlight chassis by a fixing member.

FIG. 4B is a view showing the rectangular substrate of the first embodiment from a back surface side.

FIG. 5B is a view showing the rectangular substrate of the second embodiment from a back surface side.

DETAILED DESCRIPTION

Hereinafter, an embodiment of the technology described herein will be described with reference to the drawings.

<Image Display Device>

Figure 1:
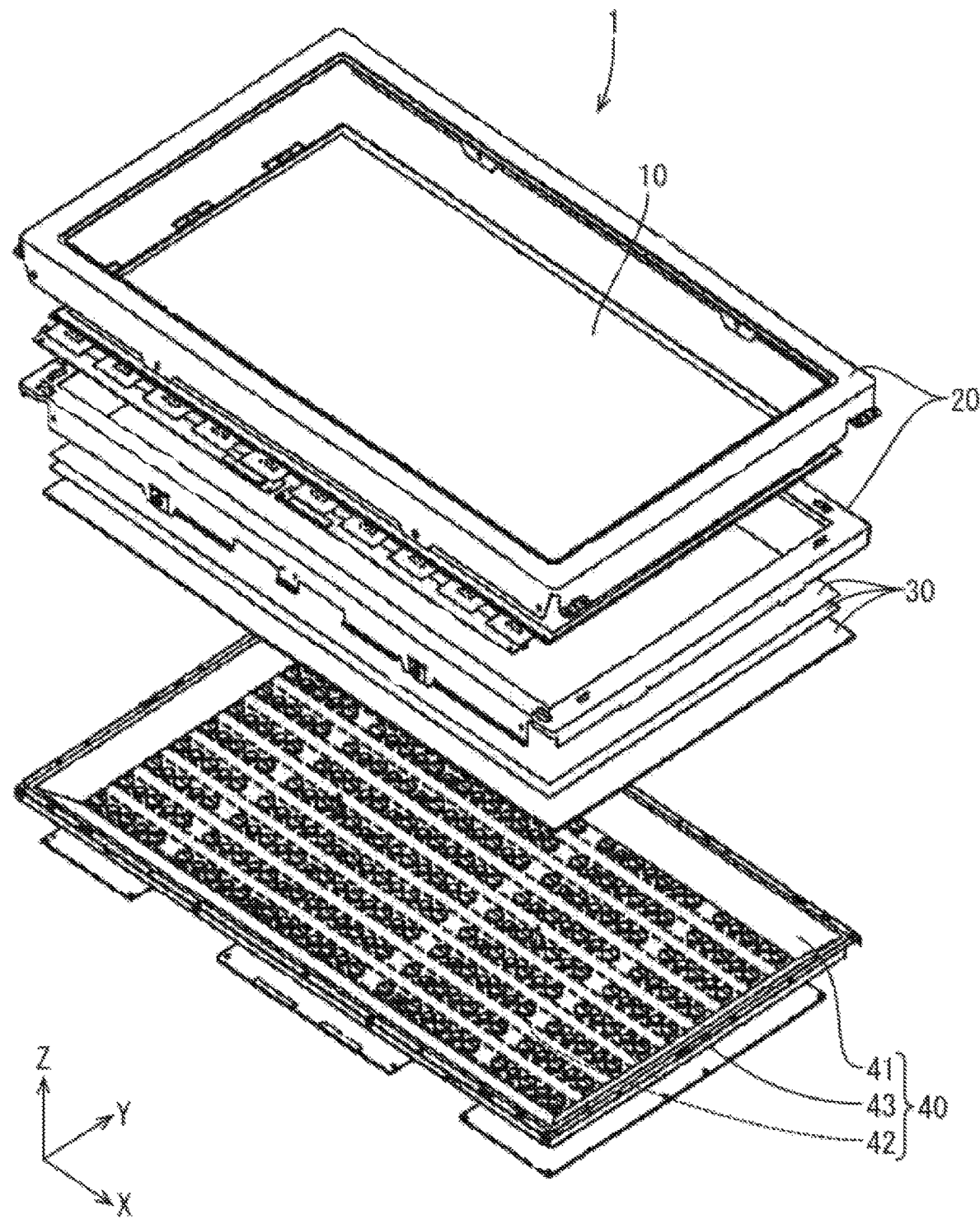
FIG. 1 is a view showing an image display device according to an embodiment.

An image display device 1 according to a first embodiment of the technology described herein will be described with reference to FIG. 1. The image display device includes a liquid crystal panel 10, a pair of bezels 20, optical films 30, and a lighting device 40.

The liquid crystal panel 10 is sandwiched by a pair of bezels 20, which are frame-shaped front side bezel and back side bezel, and the optical films 30 including a diffusion sheet, a prism sheet, and the like are held by the back side bezel. Thus, the liquid crystal panel 10 and the optical films 30 are fixed by a pair of frame-shaped bezels 20. The lighting device 40 including a reflecting plate 41, a rectangular substrate 42, and a backlight chassis 43 is disposed on the back side of the optical film 30, and the reflecting plate 41 and the rectangular substrate 42 are fixed to the backlight chassis 43.

<Lighting Device>

Figure 2:
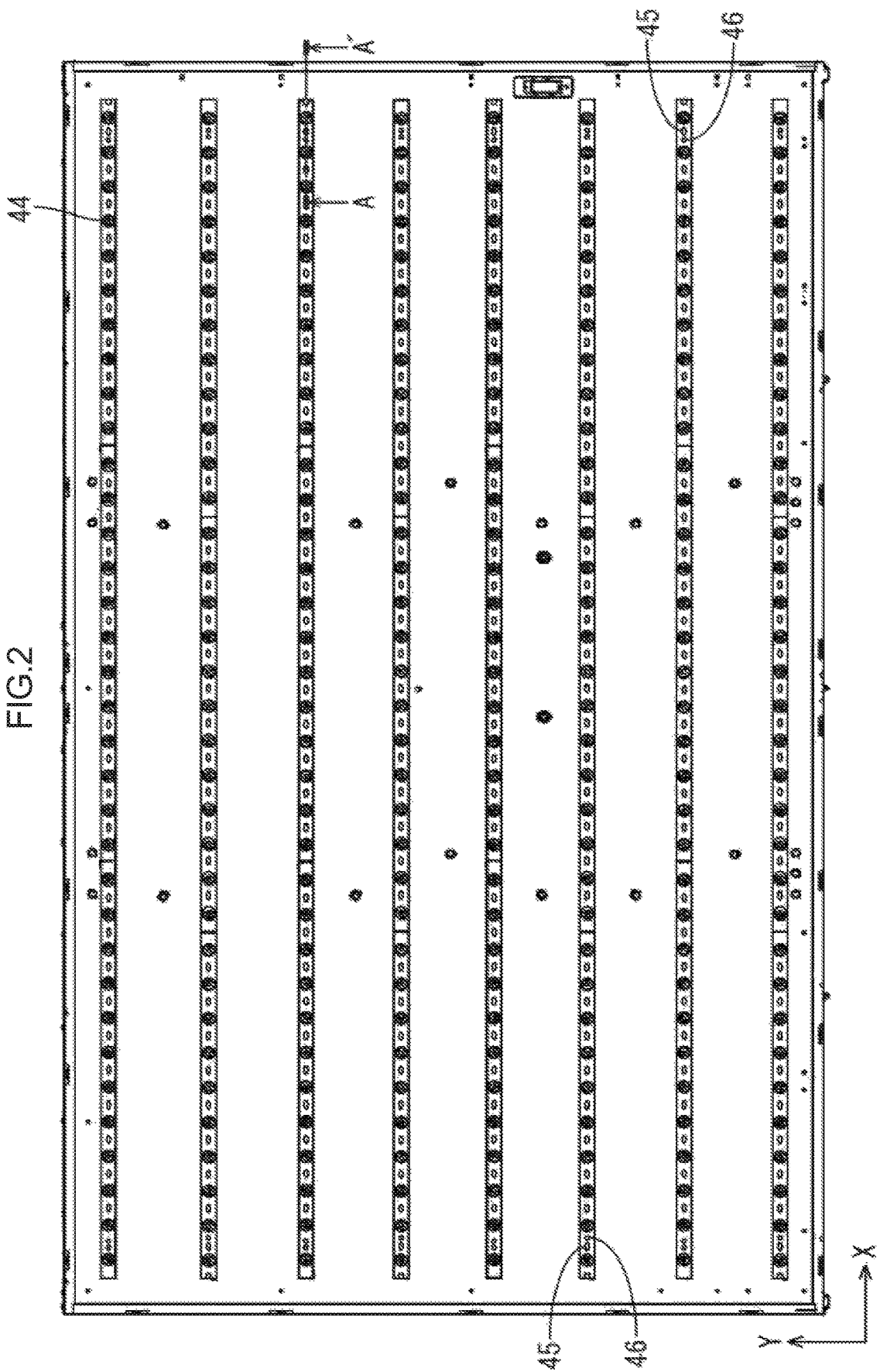
FIG. 2 is a plan view schematically showing a lighting device according to an embodiment.
Figure 3B:
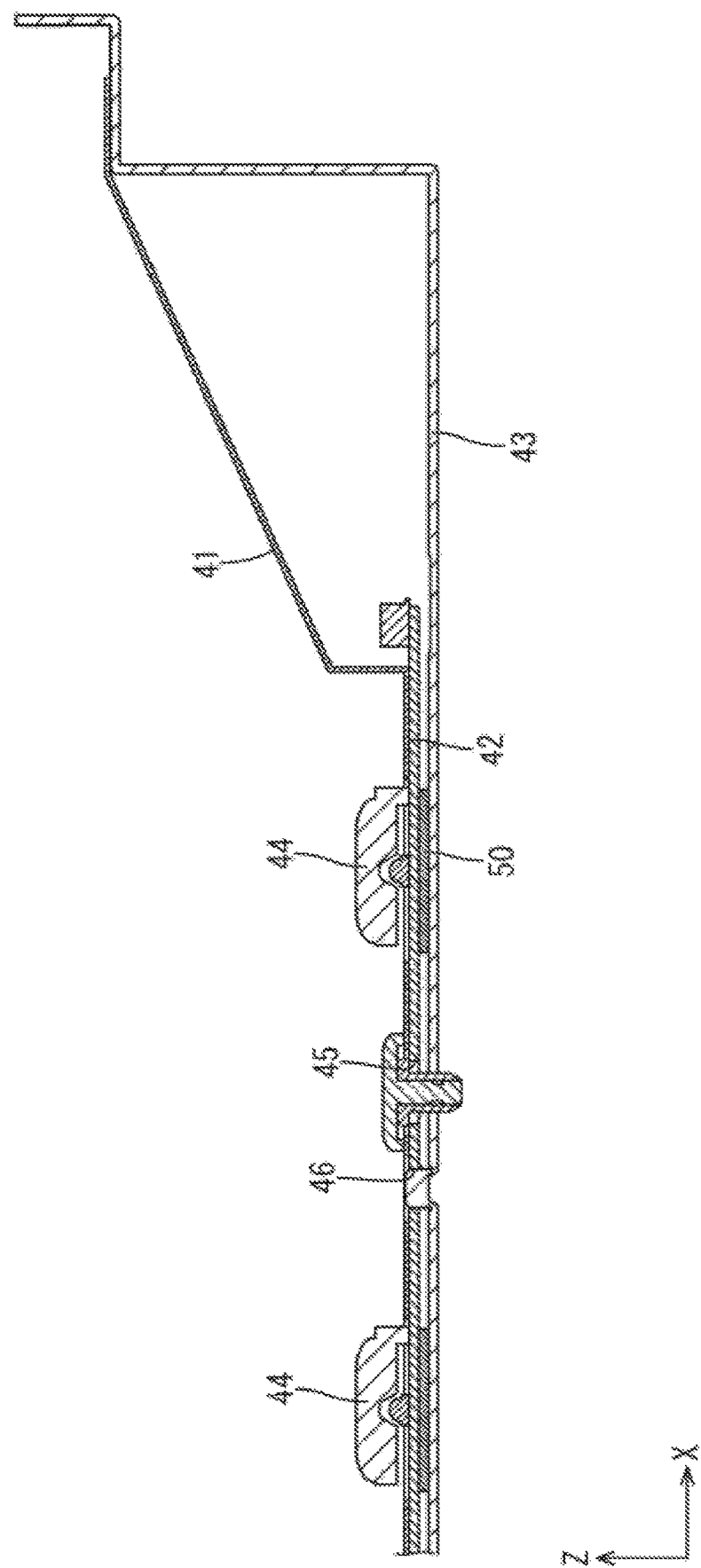
FIG. 3B is a cross-sectional view of the lighting device taken along the line A-A' in FIG. 2, and is a view showing a state in which the rectangular substrate is fixed to the backlight chassis by the fixing member.

The lighting device 40 will be described using FIGS. 2 to 3B. FIG. 2 is a plan view of the lighting device 40. FIG. 3 is a cross-sectional view of the lighting device taken along the line A-A' in FIG. 2, FIG. 3A shows a state before a rectangular substrate is fixed to a backlight chassis by a fixing member, and FIG. 3B shows a state in which the rectangular substrate is fixed to the backlight chassis by the fixing member.

As shown in FIG. 2, the rectangular substrate 42 has light sources 44 attached to a front surface thereof, and includes fixing holes (through-holes) 45 for fixing to the backlight chassis 43 and positioning holes 46 for attaching the rectangular substrate 42 to a normal position. The positioning hole 46 is provided in only one portion on the rectangular substrate 42 and has a circular shape, in particular, a regular circular shape, while the plurality of fixing holes 45 are provided on the rectangular substrate 42 and have a circular shape, in particular, an elliptical shape with a long axis in a longitudinal direction of the rectangular substrate 42. Similarly, the reflecting plate 41 includes the fixing holes 45 for fixing to the backlight chassis 43 and the positioning hole 46 for attaching reflecting sheet 42 to a normal position, and further includes light source attaching holes 47 for attaching the light sources 44.

A method of fixing a rectangular substrate 42 to a backlight chassis 43 will be described using FIGS. 3A and 3B. The light sources 44 covered with a lens are disposed at predetermined positions of the rectangular substrate 42, and heat radiation members are disposed on places corresponding to the arrangement of the light sources 44 on the back surface of the rectangular substrate 42. The positioning hole 46 of the rectangular substrate 42 and a convex portion of the corresponding backlight chassis 43 are fitted to determine an attachment position of the rectangular substrate 42. Next, the reflecting plate 41 is disposed on the rectangular substrate 42 such that the positioning hole 46 of the reflecting plate 41 and the convex portion of the backlight chassis 43, and the light source attaching holes 47 of the reflecting plate 41 and the light sources 44 correspond to each other. A fixing member 60 is attached to the fixing hole 45 so as to penetrate the reflecting plate 41, the rectangular substrate 42, and the backlight chassis 43. At this time, the heat radiation member 50 is pressed by the fixing member 60 and is stretched so as to fill a gap between the backlight chassis 43 and the rectangular substrate 42, and the backlight chassis 43 and the rectangular substrate 42 can be brought into close contact with each other. In this way, the reflecting plate 41 and the rectangular substrate 42 are fixed to the backlight chassis 43.

A peripheral portion of the reflecting plate 41 is bent and inclined, and an outer portion from the inclined portion and a flat portion formed at a tip portion of the backlight chassis 43 are laminated. The inclined portion of the reflecting plate 41 can efficiently increase the total luminous flux of all the light sources 44 attached to a bottom surface of the backlight chassis 43 and efficiently reflect the light from the light sources 44 to the front surface. In addition, since each of the light sources 44 is covered with the lens, the luminous flux of one light source is increased more efficiently by the lens.

A rectangular substrate used in a first embodiment of the technology described herein will be described using FIGS. 4A and 4B.

Figure 4A:
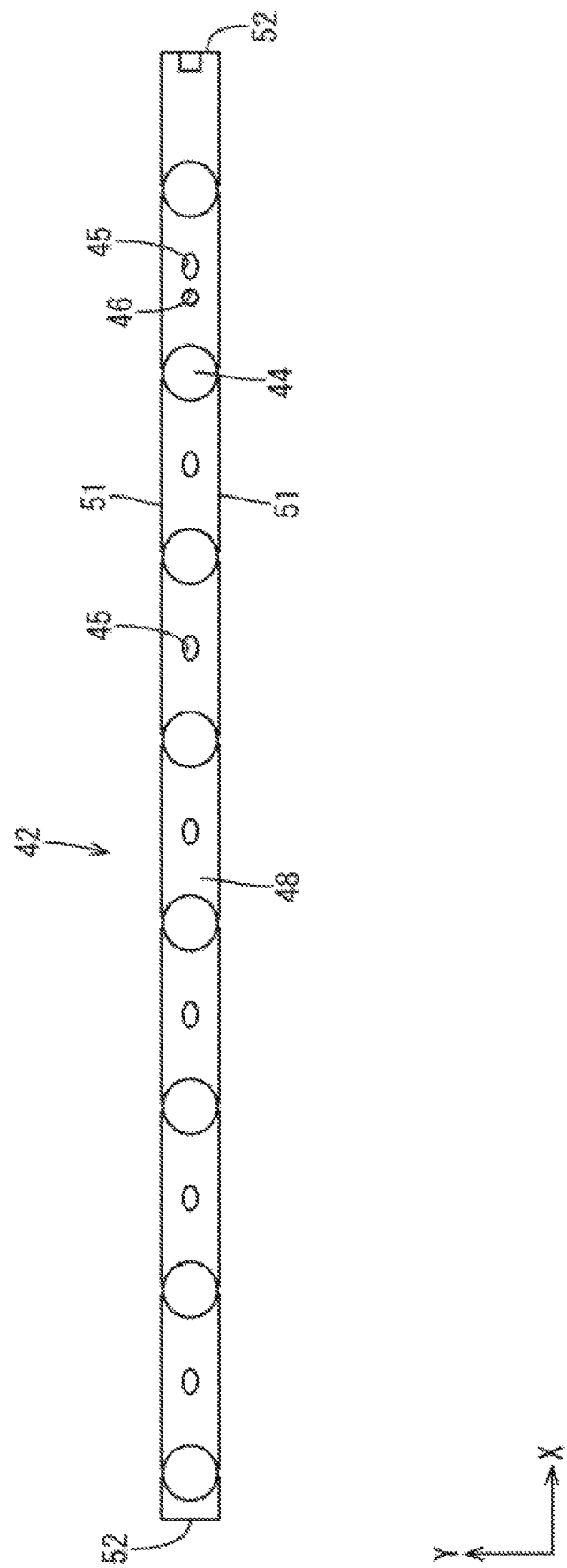
FIG. 4A is a view showing a rectangular substrate of a first embodiment from a front surface side.

As shown in FIGS. 4A and 4B, in the rectangular substrate 42, the light sources 44, the fixing holes 45, the positioning hole 46, and first alignments 47 are provided on a metal substrate 48. The metal plate 48 is a long rectangular plate-shaped member. A connector connected to a power supply circuit is provided to one end portion of the front surface of the metal substrate 48. The plurality of light sources 44 are aligned along a long side direction of the metal base material 48, and are attached to one metal substrate 48. The plurality of first alignments 47 are provided in the long side direction of the metal substrate 48 so as so face each other, and the light source 44 is disposed between a pair of first alignments 47 facing each other. In other words, the first alignments 47 are positioned so as to face each other in a short side direction of the metal substrate 48. In the present embodiment as described above, the first alignments 47 are provided on a pair of long sides 51 and 51, but "the first alignments 47 are provided on the pair of long sides 51 and 51" is not limited to a configuration in which the first alignments 47 are provided on the pair of long sides 51 and also includes a configuration in which the first alignments 47 are provided close to the pair of long sides 51. The plurality of fixing holes 45 are provided on a center line connecting midpoints of a pair of short sides of the metal substrate 48 and as elliptical-shaped through-holes between the adjacent light sources 44. Like the fixing holes 45, the positioning hole 46 is provided in only one portion on the center line of the metal substrate 48 in a circular shape, in particular a regular circular shape, and is fitted completely with the convex portion of the backlight chassis 43. The first alignments 47 may be provided so as to be able to be confirmed at least from the back surface. That is, if the first alignments 47 can be confirmed from the back surface, it can be determined that the light sources 44 are present at the places where the first alignments 47 are provided, and the heat radiation members 50 can be disposed on places of the back surface corresponding to the arrangement of the light sources 44.

The shape and the forming method of the first alignment 47 are not limited, and as long as it shows the position at which the light source 44 is disposed, the first alignment 47 may be provided so as to penetrate through the metal substrate 48 like a notch or a slit, may be provided by partially deforming the metal substrate 48 like a concave portion or a convex portion, or may be provided by partially coloring the metal substrate 48. When the first alignment 47 is provided so as to penetrate through the metal substrate 48 like the notch or the slit, or is provided by partially deforming the metal substrate like the concave portion or the convex portion, the first alignment 47 is visible and can be confirmed by touching with an operator's own hand. For example, when a part of the metal substrate 48 has a notch or the like, the position of the light source 44 can be detected without looking directly at the first alignment 47 because it is understood that the shape of the metal substrate 48 is different when the operator touches the first alignment 47 which is a notch. In particular, when a length of the short side of the metal substrate 48 is substantially equal to one side of the light source 44, the first alignment 47 is covered and hidden by the light source 44, so that a position of the first alignment 47 is visually confirmed from the back surface of the metal substrate 48. In such a case, the first alignment 47 provided with the slit, the notch, the concave portion, the convex portion, and the like is preferably used. In addition, the first alignment 47 has a shape having a vertex that tapers toward the light source 44 when viewed from the back surface side, or a shape that extends in a longitudinal direction toward the light source 44, thereby making it easier to confirm the position of the light source 44.

The light source 44 is covered with a lens and often has a size in the range of 1 to 5 mm, and as a light source used in an image display device, a light source of 1 to 3 mm square is usually used. Therefore, when the heat radiation member 50 is provided on the back surface of the metal substrate 48 in the range of about 10 mm with the light source 44 as the center, a sufficient heat radiation effect can be obtained. In addition, an interval between the adjacent light sources 44 can be set as appropriate and the light sources 44 are provided at intervals of 5 to 150 mm, but when the metal substrate 48 is rectangular, the light sources 44 may be provided at intervals of 50 to 150 mm. When the light sources 44 are disposed at such intervals, the heat radiation member 50 provided on the back side of the metal substrate 48 is also provided at equal intervals with the light sources 44.

The heat radiation member 50 may be appropriately selected as long as it is a heat radiation material such as a heat radiation sheet or a heat radiation grease, but it is preferable to improve the close-contactability between the metal substrate 48 and the backlight chassis 43. In addition, in consideration of the difference in coefficient of thermal expansion caused by the difference in material between the metal substrate 48 and the backlight chassis 43, a movable grease or a single-sided adhesive heat radiation sheet may be used.

The fixing hole 45 is provided between the adjacent light sources 44, and no heat radiation member 50 is provided in the fixing hole 45. The portion where the heat radiation member 50 is not provided is more easily peeled off from the backlight chassis 43 than the back side of the light source 44 where the heat radiation member 50 is provided. Therefore, the metal substrate 48 can be equally pressed by fixing the metal substrate 48 and the backlight chassis 43 by the fixing member 60, and the metal substrate 48 can be firmly fixed to the backlight chassis 43 while further improving the close-contactability by the heat radiation member 50. Further, since the fixing hole 45 has an elliptical shape, it is possible to absorb the difference in thermal expansion caused by the difference in material between the rectangular substrate 42 and the backlight chassis 43.

Thus, by disposing the heat radiation member 50 on the back surface of the light source 44 and fixing the metal substrate 48 and the backlight chassis 43 by the fixing member 60, the close-contactability and heat radiation effect near the light source 44 can be enhanced.

Second Embodiment

A second embodiment of the technology described herein will be described using FIGS. 5A and 5B. However, the description overlapping with the first embodiment is omitted.

Figure 5A:
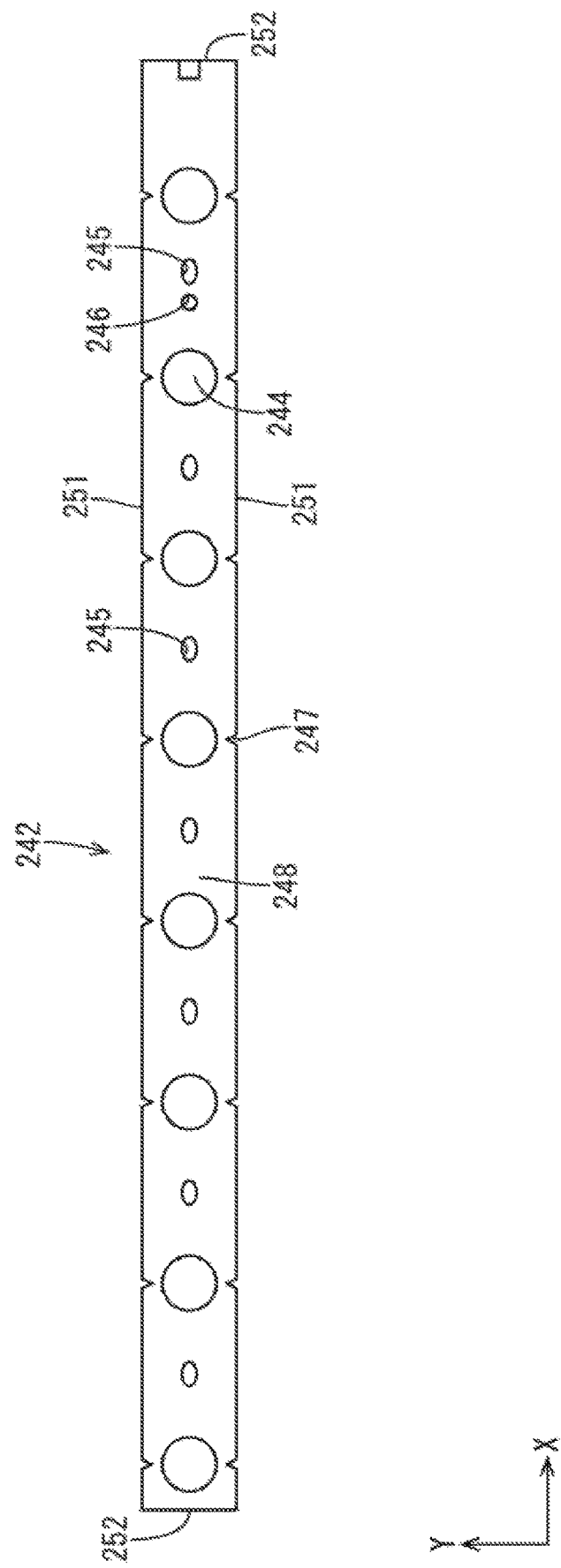
FIG. 5A is a view showing a rectangular substrate of a second embodiment from a front surface side.

As shown in FIGS. 5A and 5B, a rectangular substrate 242 includes light sources 244, fixing holes 245, a positioning hole 246, first alignments 247, and a metal substrate 248. Further, a connector connected to a power supply circuit is provided to an end portion of a front surface of the metal substrate 248. The first alignments 247 are provided at positions facing each other on a pair of long sides 251 of the metal substrate 248, and the light source 244 is provided between a pair of first alignments 247 facing each other. The first alignments 247 can be confirmed from both a front surface side and a back surface side of the metal substrate 248, and positions of the light sources 244 can be specified from positions of the first alignments 247.

When the first alignments 247 can be confirmed from both surfaces of the metal substrate 248, the first alignments 247 are provided to penetrate through the metal substrate 248 like a slit or a notch. When the first alignments 247 are provided to penetrate through the metal substrate 248, the operator can confirm the positions of the light sources 244 both visually and by touch with a hand. In addition, when a length of a short side 252 of the metal substrate 248 is longer than one side of the light source 244, that is, when the short side 252 of the metal substrate 248 is 3 mm or more, since the first alignments 247 can be confirmed from the front surface of the metal substrate 248, the positions of the light sources 244 can be accurately confirmed. Therefore, the heat radiation member 50 can be disposed at places corresponding to the arrangement of the light sources 244 on the back surface of the metal substrate 248.

The heat radiation member 50 is disposed on the back surface of the metal substrate 248 corresponding to the places where the light sources 244 are disposed, but places where the light sources 244 are not disposed tend to be peeled off from the backlight chassis 43. Therefore, the metal substrate 248 is fixed to the backlight chassis 43 by the fixing member 60 that penetrates through the fixing holes 245 between the light sources 244. Thereby, the heat radiation member 50 is stretched so as to fill a gap between the metal substrate 248 and the backlight chassis 43, and the metal substrate 248 can be brought into close contact with the backlight chassis 43, so that the heat radiation member 50 can efficiently radiate heat.

Third Embodiment

A third embodiment of the technology described herein will be described using FIGS. 6A and 6B. However, the description overlapping with the first embodiment and/or the second embodiment is omitted.

Figure 6A:
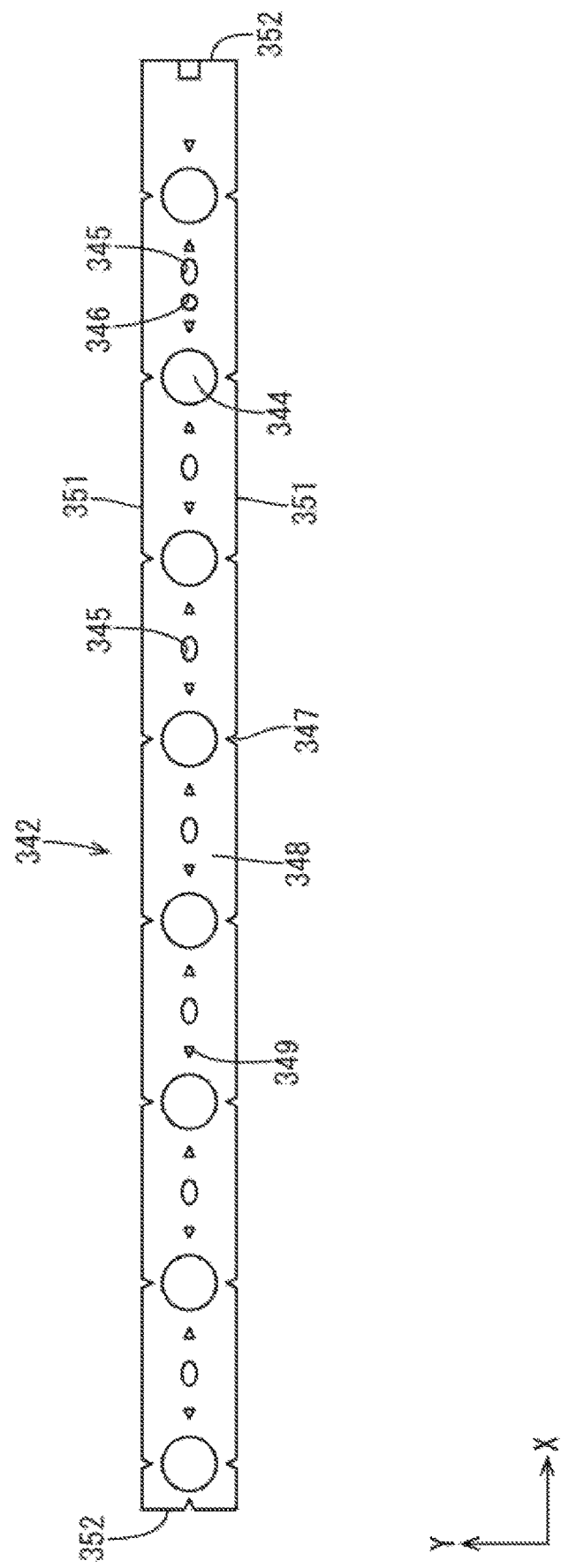
FIG. 6A is a view showing a rectangular substrate of a third embodiment from a front surface side.
Figure 6B:
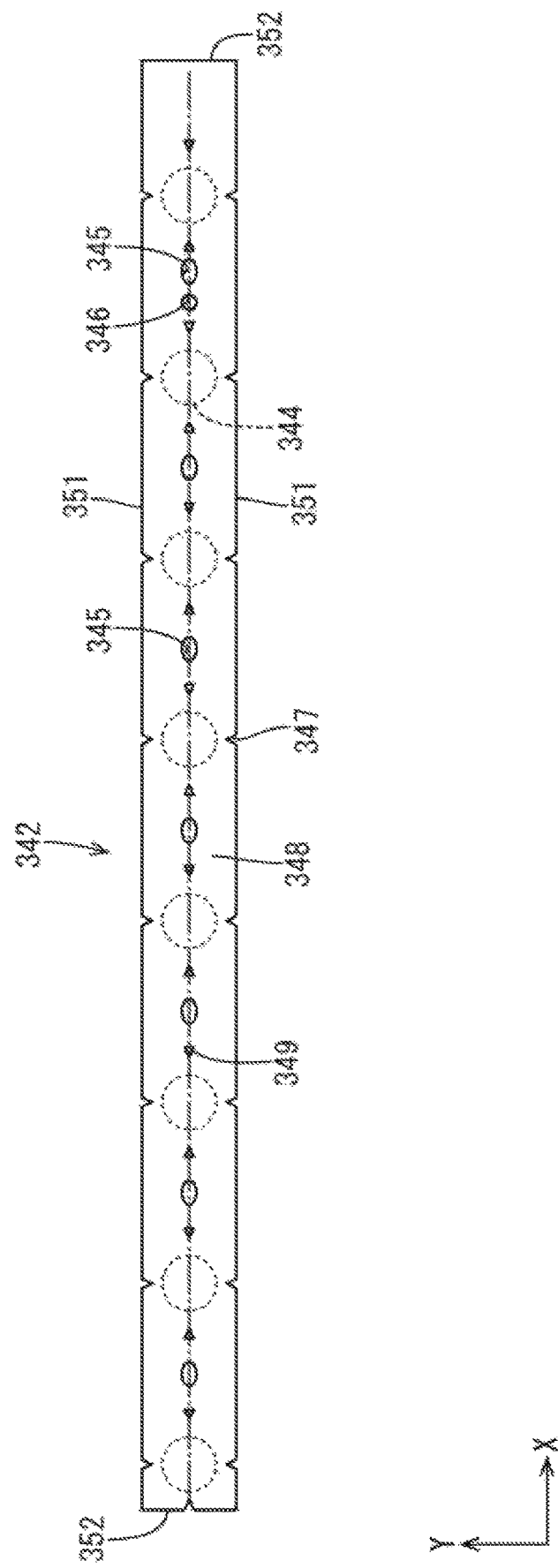
FIG. 6B is a view showing the rectangular substrate of the third embodiment from a back surface side.

As shown in FIGS. 6A and 6B, a rectangular substrate 342 includes light sources 344, fixing holes 345, a positioning hole 346, first alignments 347, a metal substrate 348, and second alignments 349. Further, a connector connected to a power supply circuit is provided to an end portion of a front surface of the metal substrate 248. The first alignments 347 is provided at positions facing each other with the light source 344 interposed therebetween on a pair of long sides 351 of the metal substrate 348. The second alignments 349 are provided on a center line connecting midpoints of short sides 352 of the metal substrate 348. In FIG. 6B, the center line is indicated by a one-dot chain line. That is, the light sources 344, the fixing holes 345, the positioning hole 346, and the second alignments 349 are all formed in the same straight line shape of the metal substrate 348. In addition, the first alignments 347 and the second alignments 349 are provided around the light sources 344.

In addition, when a length of the short side 352 of the metal substrate 348 is substantially equal to one side of the light source 344, that is, when the short side 352 of the metal substrate 348 is about 1 to 3 mm, the first alignment 347 is covered with the light source 344. Even in such a case, positions of the light sources 344 can be confirmed by the second alignments 349.

Both the first alignments 347 and the second alignments 349 are not limited in shape and forming method, and may be provided by penetrating through the metal substrate 348 like a notch or a slit. Alternatively, the metal substrate 348 may be partially deformed such as a concave portion or a convex portion, or the metal substrate 148 may be partially colored and provided. When the first alignment 347 and the second alignment 349 are provided so as to penetrate through the metal substrate 348 like the notch or the slit, or are provided by partially deforming the metal substrate like the concave portion or the convex portion, the first alignments 347 and the second alignments 349 are visible and can be confirmed by hand. That is, when a part of the metal substrate 348 has the notch or the like, the notched portion of the metal substrate 348 can be confirmed by hand, so that the position of the light source 344 can be more accurately detected.

Further, when the first alignments 347 and the second alignments 349 are covered with the light sources 344, the first alignments 347 and the second alignments 349 cannot be confirmed from a front surface of the metal substrate 348. Even in such a case, if the first alignments 347 and the second alignments 349 are provided in a shape such as a slit, a notch, a concave portion, or a convex portion, the operator can confirm the positions of the light sources by touching a back surface of the metal substrate 348 with his/her hand. In addition, since the position and size of the light source 344 can be accurately confirmed, the heat radiation member 50 can be disposed at a place corresponding to the center position of the light source 344, and a heat radiation effect can be enhanced.

Other Embodiment

In the above-described embodiments, although it has been described that the first alignments and the second alignments are provided by the slit, the notch, the concave portion, the convex portions, or the like, the first alignments and the second alignments are not limited thereto, but are suitably selected and may be provided by a combination thereof.

The invention claimed is:

1. A lighting device comprising:
   a chassis;
   light sources; and
   a rectangular substrate formed of a long rectangular plate-shaped member disposed in the chassis, having the light sources disposed on a front surface thereof, and having a plurality of first alignments indicating positions where the light sources are disposed,
   wherein the plurality of first alignments are provided at positions facing each other with the light source interposed therebetween on a pair of long sides of the rectangular substrate, and are configured to be confirmed at least from a back surface side of the rectangular substrate.

2. The lighting device according to claim 1, wherein the rectangular substrate is provided with a heat radiation member on the back surface side where the light sources are attached.

3. The lighting device according to claim 1, wherein the plurality of first alignments are configured to be confirmed from both the front surface side and the back surface side of the rectangular substrate.

4. The lighting device according to claim 1, wherein
   the rectangular substrate further includes a plurality of second alignments indicating positions where the light sources are disposed on a line connecting midpoints of each of a pair of short sides, and
   the first alignments and the second alignments are provided around the light sources.

5. The lighting device according to claim 2, wherein
   the rectangular substrate has a plurality of through-holes, and is fixed to the chassis by a fixing member through the plurality of through-holes, and
   the rectangular substrate and the chassis are in close contact with each other by the heat radiation member.

6. An image display device comprising the lighting device according to claim 1.

* * * * *